UNITED STATES PATENT OFFICE.

ALICE E. BROWN, OF SHELBURNE FALLS, MASSACHUSETTS.

METHOD OF TREATING MAPLE-SYRUP.

1,245,669. Specification of Letters Patent. Patented Nov. 6, 1917.

No Drawing. Application filed May 12, 1916. Serial No. 97,023.

*To all whom it may concern:*

Be it known that I, ALICE E. BROWN, a citizen of the United States, residing in Shelburne Falls, county of Franklin, and State of Massachusetts, have invented new and useful Improvements in Methods of Treating Maple-Syrup.

Heretofore it has been found practically impossible to so treat maple syrup in quantity as to produce a smooth, soft, fine grained, creamy result, especially in cake form.

Maple sugar heretofore produced has been granulated to a large extent and it has been found practically impossible to produce the uniform creamy consistency in cake or hardened form which is found most desirable.

The object of my invention is to provide a method by which the desired result may be attained and by which the objections heretofore existing may be overcome.

In carrying out my method I take the pure, clean, maple syrup and subject it to boiling action until it reaches a temperature of substantially 236 degrees Fahrenheit. I then pour the same in shallow pans preferably of say four quart capacity, depositing the syrup to a depth of about one and one-half inches. The syrup is then cooled to a temperature of 100 degrees Fahrenheit. This I accomplish most conveniently by placing the pans in a water tank and allowing cool water to flow around the pans until the temperature of the syrup is reduced to the desired point. The contents is then subjected to a stirring operation. This I prefer to accomplish by the employment of a stirrer or mixer operated by power and I prefer that the stirring be quite rapid, that is to say the stirrer should revolve at about 700 revolutions per minute and that the stirring operation be continued until the mass begins to harden and reaches a point where it is likely to begin to granulate at which point the stirring operation is discontinued and the pan with contents is inserted in a double boiler and heat applied until the material has reached a creamy consistency, this being when the same has reached a temperature of about 138 degrees Fahrenheit. The material is then run into molds of any suitable or desired form and allowed to cool after which it will be found to have hardened and still retain its creamy character. In other words the material will have attained a condition which is known as "smooth."

I find by experience that the first heating or cooking operation in cold weather may be reduced two degrees.

If the product is to be packed in glass jars so as to be taken out with a spoon, I find it desirable to carry on the first heating or cooking operation at four degrees lower temperature than that first defined.

Having therefore described my invention what I claim and desire to secure by Letters Patent is:—

1. The method of treating maple syrup comprising boiling until it reaches a temperature of 236 degrees Fahrenheit, then cooling to a temperature of approximately 100 degrees Fahrenheit, and then stirring rapidly until almost granulated.

2. The method of treating maple syrup to produce a smooth creamy consistency comprising boiling until the mass reaches a temperature of 236 degrees Fahrenheit, then cooling to 100 degrees Fahrenheit, then stirring rapidly, then heating until it reaches a creamy consistency, and then forming into cakes, substantially as described.

3. The method of producing a non granulated non fluid maple product comprising boiling maple syrup until it reaches a temperature of substantially 236°, then cooling gradually to substantially 100°, then rapidly stirring until it almost begins to granulate, then heating and molding.

ALICE E. BROWN.